Aug. 5, 1952     D. P. MERRITT     2,606,298
APPARATUS FOR MAINTAINING OPTIMUM TEMPERATURES IN MOTOR VEHICLES
Filed Feb. 20, 1950     2 SHEETS—SHEET 2

INVENTOR.
Daniel P. Merritt
BY *Lancester, Allen & Rommel*
ATTORNEYS.

Patented Aug. 5, 1952

2,606,298

UNITED STATES PATENT OFFICE 2,606,298

APPARATUS FOR MAINTAINING OPTIMUM TEMPERATURES IN MOTOR VEHICLES

Daniel P. Merritt, Gouverneur, N. Y.

Application February 20, 1950, Serial No. 145,175

5 Claims. (Cl. 290—2)

1

The present invention relates to apparatus for maintaining normal or optimum temperatures in the passenger compartments of motor vehicles such as automobiles, busses and trucks, and the cooling systems of the motors thereof during cold weather, especially when they are parked or in unheated garages, so as to render the passenger compartments comfortable for occupants at all times and to facilitate easy starting of the motors.

The principal object of the invention is to provide apparatus which may be readily installed in modern motor vehicles, and which is automatic in maintaining the desired or normal temperature as set forth without requiring an attendant. The invention is particularly useful during cold weather to facilitate easy starting of the motor vehicle equipped with the apparatus and to render the passenger compartment comfortably warm even though the vehicle may be parked on a lot, along the highway or in an unheated garage for a considerable length of time. By its use persons attending theaters, parties or other functions, shopping or stopping for meals while on tours, can return to their motor vehicles and journey on in comfort and not experience the chill, during cold weather, so often experienced even though the vehicle is equipped with one of the conventional types of heaters using the fluid from the engine cooling system as a heating medium.

It has been proposed, in the past, to provide time controlled apparatus for automatically starting the engine of a motor vehicle, while parked, not for the purpose of maintaining optimum temperature for comfort of persons in the passenger compartment, but to prevent freezing of water in the cooling system of the engine. Such apparatus has the disadvantage in that operation of the engine is automatically started and stopped at set intervals of time, which makes it necessary to so design the time control mechanism for automatic operation of the engine to keep the water from freezing at the lowest temperature likely to exist in the locality where the vehicle is being used otherwise freezing is likely to occur, and is wasteful as to fuel, etc., in that it automatically runs the engine when not needed during higher winter temperatures.

It has also been proposed, as far back as 1920, to provide thermostatically controlled apparatus for a like purpose as next above described, but particularly designed for use with a starting motor equipment including the well known Bendix or inertia gear drive between the motor armature and the flywheel ring gear. Because of such starting motor equipment requiring a

2 manually operable switch for its electric circuit, separate from the ignition switch, and due to the fact that fuel then generally available was not always of a quality to assure at all times ready starting of the engine, it was found necessary to provide two separate switches in the thermostatically controlled apparatus, to function like the regular starting and ignition switches, when the latter are "open," a third switch to bring the thermostatically controlled apparatus into readiness for automatic use, a mechanical centrifugal governor controlled switch to break the starting motor circuit when the engine is operating under its own power and its speed has reached a predetermined degree, and a circuit breaker in the starting motor circuit to break the circuit in the event the engine does not start responsive to operation of the starting motor so as to not dissipate the energy of the usual storage battery. Such apparatus is expensive to manufacture and install, requires attention of the operator to open two and close a third manually operable switch to condition the apparatus for automatic operation, and even then does not provide for heat conditioning the passenger compartment of the vehicle.

The present invention is particularly well adapted for installation in motor vehicles of the type embodying a vacuum-controlled switch in the solenoid relay circuit of a starting motor circuit, whereby both of said circuits are broken due to vacuum in the fuel intake way, such as the intake manifold, of the engine when the engine is operating under its own power.

Another object of the invention is to conserve fuel by not operating the engine under its own power after the cooling medium of the engine has been brought to a predetermined temperature for easy starting, if there is no demand for a higher temperature in the passenger compartment or the temperature there has been satisfied before the cooling medium temperature has been raised to the desired degree. This is preferably accomplished by providing a thermostatic switch in the fan motor circuit of the heater located in the passenger compartment, the heater being operatively connected to the engine so as to utilize heat generated during its operation. In this way a manually operable switch in the fan motor circuit may be provided to break the circuit only when heat is not needed, and need not be opened every time the operator parks the vehicle.

Other objects and advantages of the invention will appear in the following detailed description of a highly satisfactory embodiment of my invention, taken in connection with the accompanying drawings forming a part of this specification, and in which drawings.

Figure 1:
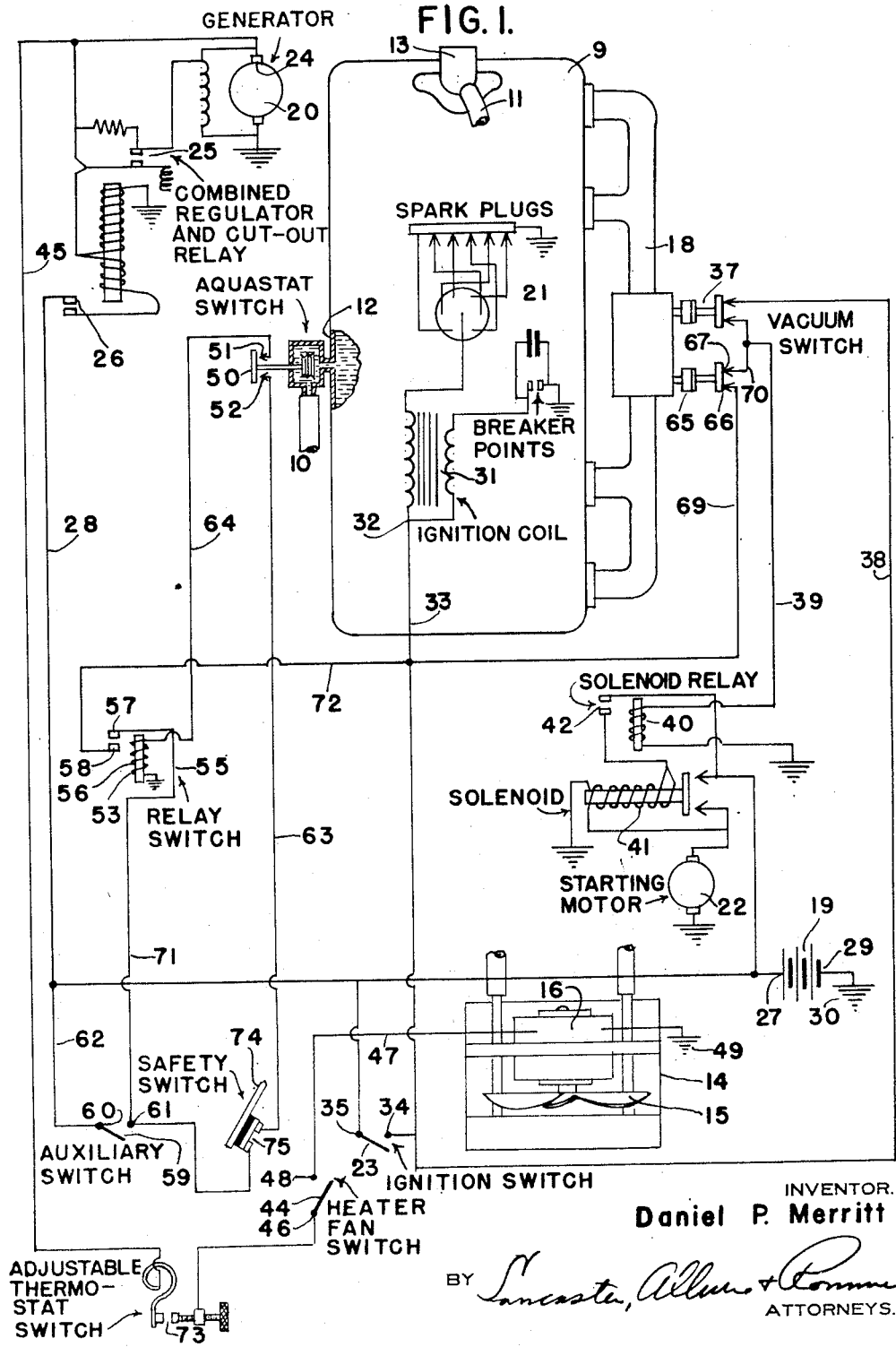
Fig. 1 is a view partly in plan to show a typical motive power plant and vehicle heater, and partly diagrammatic to disclose suitable electrical circuits whereby the objects of the present invention may be carried out.

In the drawings I have illustrated a portion of a motor vehicle 5 the body of which is divided by a partition 6 to provide a motor compartment 7 and a passenger compartment 8. In the former compartment is an internal combustion engine 9 which, through conduits 10 and 11 conveniently connected to the water jacket 12 and the top radiator connection 13, respectively, of the engine, supplies heated fluid, as by thermo-siphonic action or otherwise, to a heater 14 located in the passenger compartment. The heater is shown as including a fan 15 driven by an electric motor 16. The extent to which the compartment 8 is heated is governed somewhat by operation of the fan. When it is idle a small degree of heat from the fluid circulating through the conduits 10 and 11 is transmitted to the compartment 8, but when the fan is operating a much greater amount of heat is transferred from the radiator of the heater 14 due to circulation of the air in the passenger compartment.

The motive power plant of the vehicle, in the example shown comprises the engine 9, including any suitable fluid cooling system of which the water jacket 12 and connection 13 are a part, a fuel intake way 18, such as in an intake manifold in which a substantial vacuum is created when the engine is operating under its own power, a storage battery 19, an electric generator 20 operated by the engine in any suitable or conventional manner, an ignition system 21 deriving its electrical energy from the battery and/or generator, an electric starting motor 22 operatively connected with the engine in any approved or conventional manner, and a primary manually operable ignition switch 23 for making and breaking the circuits of the ignition system and starting motor, such switch 23 being of any approved type, usually disposed on the instrument board or steering column of the vehicle.

The electric generator, in the example shown has associated with its output terminal 24, a combined regulator and cut-out relay 25 of conventional type, the output terminal 26 of which is connected with one pole 27 of battery 19 as by wire 28 the other pole 29 thereof being grounded as at 30.

The ignition system is shown as including a conventional type of induction coil 31 to the primary lead-in terminal 32 of which is connected an electric conductor 33 having connection with the output terminal 34 of switch 23. The input terminal 35 of the switch 23 may be connected to the wire 28 and hence to the pole 27 of battery 19.

Referring now to the circuit of the starting motor 22 it preferably includes a vacuum or suction operated switch 37 of the type whereby the starting circuit is broken whenever the engine 9 is operating under its own power, and renders the equipment in readiness for operation of the starting motor whenever the engine is inert, subject to operation of the switch 23 or any other type of starting motor switch. An example of a suitable suction operated switch such as that indicated at 37 will be found in the Dyer Patent 2,302,685, November 25, 1942, although it is to be understood that any suitable type of vacuum or suction operated switch may be used. In the example shown the circuit of the starting motor comprises an electric conductor 38 connected to one terminal of switch 37 and the output terminal 34 of switch 23; an electric conductor 39 connected to the other terminal of switch 37 and any suitable relay switch 40; and a solenoid shift starter drive with overrunning clutch indicated at 41 of which examples are shown in the aforesaid patent to Dyer. In the example shown the relay switch is activated to close the gap 42 when switch 23 is closed by the operator of the vehicle, provided the suction operated switch 37 is also closed, so as to complete the circuit of the solenoid shift starter drive 41. However the circuit of the relay switch 40 is broken, and hence the circuit of the starting motor is also broken, as soon as there is sufficient suction in the fuel intake way (such as when the motor 9 is operating under its own power) to operate the switch 37 to an open condition.

The foregoing description is of a general nature and discloses one of many examples of a motor vehicle having a passenger compartment and a motive power plant, the latter comprising an internal combustion engine including a fluid cooling system and a fuel intake way in which a vacuum is created when the engine is operating, a storage battery, an electric generator, an ignition system deriving its electric energy from the battery and generator, an electric starting motor for the engine and a manually operable ignition switch for making and breaking the circuits of the ignition system and starting motor. It is to be understood, however, that the present invention may be applied to motor vehicles having different starting systems, such as those which do not embody a suction operated switch 37, and also those where a separate switch is provided for each the ignition system and the starting motor system.

Figure 2:
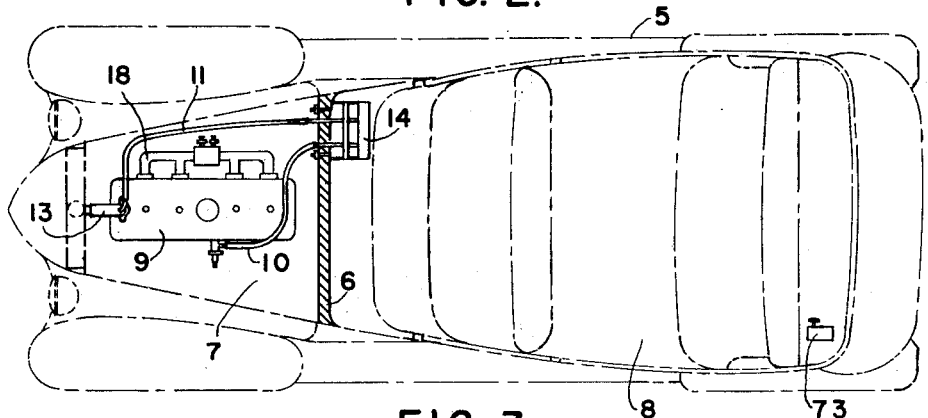
Fig. 2 is a horizontal section (somewhat diagrammatic) through a motor vehicle showing suitable locations of units incorporated in my invention.
Figure 3:
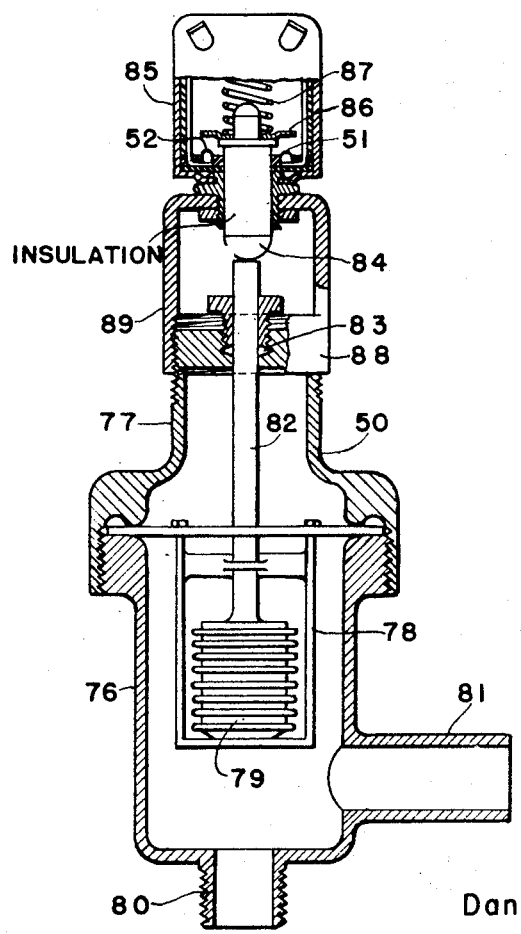
Fig. 3 is a detail view, partly in plan and partly in horizontal section showing, by way of example, a suitable Aquastat switch which may be used in one of the circuits, according to my invention.

The present invention includes a heater 14 of any suitable type susceptible of delivering heat to the passenger compartment 8, preferably including the motor operated fan 15, in the example shown controlled by a switch 44 preferably deriving its current from the output terminal 24 of generator 20, as by electric conductor 45 between terminal 24 and the input terminal 46 of switch 44 and electric conductor 47 between the output terminal 48 of switch 44 and one pole of the fan motor 16, (the other pole of the motor being grounded, in the example shown, at 49); a thermostatic switch 50 (a suitable type of which is shown in Fig. 3), operatively connected with the cooling system of the engine 9, including input terminal 51 and output terminal 52 adapted to be bridged or closed when the fluid in the cooling system is below a first predetermined temperature, such as around 130° F. and to open when the fluid is above a predetermined temperature somewhere around 140° F.; an electric relay switch 55 comprising an electro-magnet 56 including a coil 53, and input and output switch points 57 and 58, respectively, adapted to engage when the electromagnet 56 is energized; a supplemental or auxiliary manually operable electric switch 59 including an input terminal 60 and an output terminal 61; an electric conductor 62 between the battery 19 and input terminal 60; an electric conductor 63 between the output terminal 61 and terminal 52 of switch 50; an electric conductor 64 between the other terminal 51 of switch 50 and battery 19, including the coil 53 for energizing the electromagnet 56; a vacuum or suction operated switch 65, which may be like or similar to switch 37 also associated with the fuel intake way 18 including an input terminal 66 and an output terminal 67 adapted to be bridged or closed when there is no vacuum in the way 18 and having an electric conductor 69 between the input terminal 66 and the output terminal 58 of relay switch 55, and a conductor 70 between output terminal 67 and the conductor 39; an electric conductor 71 between the output terminal 61 of switch 59 and the input switch point 57 of relay switch 55; an electric conductor 72 between the output switch point 58 of relay switch 55 and the ignition system of the engine; and preferably an adjustable thermostat switch 73 interposed in electric conductor 45, the switch 73 preferably being located in a zone toward the rear of the passenger compartment 8, as shown in Fig. 2. This switch 73 may be set to open at some appropriate ambient temperature, say around 70° F.

It is desirable to provide safety circuit control means whereby the apparatus embodied in the motor vehicle cannot operate unless the gearset is in neutral, and the emergency brake is "on." This is to prevent the vehicle from being propelled when the vehicle has been parked, and the engine is automatically started for the purpose of heating the passenger compartment and maintaining an engine temperature for easy starting. Such safety circuit control means are shown in United States Patents to Stein, 1,293,569, February 4, 1919, and Cowen 1,386,844, August 9, 1921, the former showing switch means associated with the gear set shift lever, which switch means is closed only when the lever is in "neutral," and the latter associated with the emergency brake lever whereby the switch means is closed only when the lever is in position to set the brakes to "on" condition. I prefer to employ the latter switch means since operators of motor vehicles naturally shift to "neutral" when coming to a stop but sometimes fail to set the emergency brake "on." Hence a parked vehicle may be caused to drift as a result of starting and operation of the engine, due to vibration, but which drifting would not likely occur under ordinary circumstances. In the example shown I indicate in Fig. 1 an emergency brake lever 74 and a safety switch 75 illustrated as closed when the brakes are set and whereby the apparatus of my present invention will not operate even though the switch 59 is closed, if the operator fails to set the emergency brakes and hence fails to close the switch 75.

In Fig. 3 I show suitable details of a thermostatic or Aquastat switch 50 including the input and output terminals 51 and 52, respectively. It comprises a casing including separable sections 76 and 77 removably supporting a frame 78 to which one end of a thermostatic element 79, such as bellows or Sylphon, is secured. The casing section 76 is shown provided with an inlet nipple 80 which may be tapped into the water jacket 12 and a laterally extending outlet nipple 81 to which the conduit 10 may be connected. Thus fluid of the engine cooling system may flow through the casing and act upon the thermostatic element 79. The free end of the latter is provided with a rod 82 which may pass through a stuffing box 83 carried by the casing section 77 and act upon a plunger 84 forming a part of any suitable switch unit 85 such as that disclosed in patent to Rickmeyer 2,436,898, March 2, 1948. The plunger 84 carries a bridge piece of metal 86 adapted to bridge the contacts or terminals 51 and 52, responsive to an expansion spring 87 when the temperature of the fluid acting upon thermostatic element 79 is such as to cause it to contract from the condition shown in Fig. 3. The switch unit 85 may be adjustably supported on the casing section 77, by a sleeve 88 having screw threaded engagement with the section 77 and a yoke 89 as is clear from an inspection of Fig. 3.

The operation of the apparatus is as follows. Upon drawing the motor vehicle to a stop, after a run, the motor and the passenger compartment of the vehicle are presumably heated to temperatures normal to those not equipped with this apparatus, due to operation of the motor and conventional heater. The operator then turns ignition switch 23 to an "off" position thereby stopping the motor and applies the emergency brakes through lever 74. The operator then follows this with operation of the supplemental auxiliary switch 59 to an "on" position. If the car heater switch 44 is not in an "on" position, it is manually operated to such position. As the motor cools so that the fluid in the casing of the thermostatic or Aquastat switch 50 acting upon the thermostatic element 79 permits the switch unit 85 to close the circuit through contacts 51 and 52, the circuits of the ignition and starting systems are completed thus causing the engine to operate under its own power. The switch 65 will break the starting motor circuit as soon as there is sufficient suction in the intake way 18. If the temperature in the passenger compartment 8 has also lowered to an undesirable extent, according to the setting of switch 73, the generator 20 will also supply current to the fan motor 16 and circulate heated air from the heater 14 in the passenger compartment so long as the switches 59 and 73 are closed. If no additional heat is required in the passenger compartment, the switch 73 functions to prevent operation of the fan motor 16. When the cooling fluid of the motor has been heated to the extent desired, according to adjustment of the Aquastat switch 50, the latter will open, breaking the ignition circuit of the motor and thus stopping operation of the motor.

It is to be observed that, with this system, the fan motor will operate only when the engine is running at a speed sufficient to generate electric current, and then only when there is heat demand in the passenger compartment, according to setting of the thermostat switch 73.

I claim:

1. In a motor vehicle of the class having a passenger compartment and a motive power plant, comprising an internal combustion engine, a course of electric current including a storage battery, and an electric generator operatively connected with said motor for generating electric current upon operation of the engine, a combined regulator and cut-out relay associated with said generator for charging said battery upon the generator attaining a predetermined output of electric current, a starting motor, a starting motor circuit including said battery, an ignition circuit deriving its current from said source of electric current, and primary manually operable control switch means operable from said compartment for controlling said circuits, the combination of means for automatically maintaining optimum temperatures of said engine and heating said passenger compartment for easy starting of the engine and comfort of passengers in said compartment, said means comprising a heater including an electrically operated fan for delivering and circulating heated air in said passenger compartment, an electric relay switch for controlling the energization of the starting motor and ignition circuits, comprising an electromagnet and input and output switch points adapted to engage by energization of the electromagnet, means for controlling the energization of the electro-magnet of said relay switch from said source of electric current including a secondary manually operated control switch operable from within said passenger compartment and a thermostatically controlled switch for automatically closing the circuit through the electromagnet when said secondary switch is closed and the motor is at a predetermined temperature and automatically opening the circuit when the motor attains a second higher predetermined temperature, means for energizing the ignition circuit and starting motor from said source of current when said primary operable control switch is open and said secondary manually operated switch is closed, controlled by the closing of the switch points of said electric relay switch, and electrical conducting means between said generator and said motor operated fan of the heater, whereby heat is circulated in said passenger compartment only when said engine is running.

2. In a motor vehicle of the class having a passenger compartment and a motive power plant, comprising an internal combustion engine, a source of electric current including a storage battery, and an electric generator operatively connected with said motor for generating electric current upon operation of the engine, a combined regulator and cut-out relay associated with said generator for charging said battery upon the generator attaining a predetermined output of electric current, a starting motor, a starting motor circuit including said battery, an ignition circuit deriving its current from said source of electric current, and primary manually operable control switch means operable from said compartment for controlling said circuits, the combination of means for automatically maintaining optimum temperatures of said engine and heating said passenger compartment for easy starting of the engine and comfort of passengers in said compartment, said means comprising a heater including an electrically operated fan for delivering and circulating heated air in said passenger compartment, an electric relay switch for controlling the energization of the starting motor and ignition circuits, comprising an electro-magnet and input and output switch points adapted to engage by energization of the electro-magnet, means for controlling the energization of the electro-magnet of said relay switch from said source of electric current including a secondary manually operated control switch operable from within said passenger compartment and a thermostatically controlled switch for automatically closing the circuit through the electro-magnet when said secondary switch is closed and the motor is at a predetermined temperature and automatically opening the circuit when the motor attains a second higher predetermined temperature, means for energizing the ignition circuit and starting motor from said source of current when said primary operable control switch is open and said secondary manually operated switch is closed, controlled by the closing of the switch points of said electric relay switch, a second thermostatically controlled switch in said passenger compartment, and electrical conducting means, including said second thermostatically controlled switch, when closed, between said generator and said motor operated fan of the heater, whereby heat is circulated in said passenger compartment only when said engine is running and said thermostatically controlled switch is closed.

3. In a motor vehicle including a passenger compartment, a motive power plant, including an internal combustion engine with its ignition system, a battery electrical power source, a starting motor and a charging generator electrical power source; manual control means for energizing the starting motor and ignition system for the starting and operation of the engine, a heating unit in the passenger compartment deriving its heat from the heat of the internal combustion engine, an electrically operated fan cooperating with said heating unit, means for connecting said electrically operated fan with one of said sources of electrical power only when the engine is in operation, a thermostatic switch for stopping said fan when the compartment attains a predetermined temperature, and means for automatically maintaining optimum temperatures of said engine and the passenger compartment for easy starting of the engine and comfort of passengers in said compartment, said means including a temperature controlled switch for effecting the starting and stopping of the engine by the control of said starting motor and ignition system, whereby the engine temperature may be maintained within a definite temperature range and the electrically operated fan is operated during periods of the automatic operation of the engine only in response to a requirement for heat as detected by the operation of the thermostatically operated switch in the passenger compartment.

4. In a motor vehicle including a passenger compartment, a motive power plant, including an internal combustion engine with its ignition system, a battery electrical power source, a start- and a charging generator, manual control means for energizing the starting motor and ignition system for the starting and operation of the engine, a heating unit in the passenger compartment deriving its heat from the heat of the internal combustion engine, an electrically operated fan cooperating with said heating unit, means for connecting said electrically operated fan with the charging generator so as to operate only when the engine is in operation, a thermostatic switch for stopping said fan when the compartment attains a predetermined temperature, and means for automatically maintaining optimum temperatures of said engine and the passenger compartment for easy starting of the engine and comfort of passengers in said compartment, said means including a temperature controlled switch for effecting the starting and stopping of the engine by the control of said starting motor and ignition system, whereby the engine temperature may be maintained within a definite temperature range and the electrically operated fan is operated during periods of the automatic operation of the engine only in response to a requirement for heat as detected by the operation of the thermostatically operated switch in the passenger compartment.

5. In a motor vehicle including a passenger compartment, a motive power plant, including an internal combustion engine with its ignition system, a battery electrical power source, a starting motor and a charging generator electrical power source, manual control means for energizing the starting motor and ignition system of the starting and operation of the engine, a heating unit in the passenger compartment deriving its heat from the heat of the internal combustion engine, an electrically operated fan cooperating with said heating unit, means for connecting said electrically operated fan with one of said sources of electrical power only when the engine is in operation, a thermostatic switch for stopping said fan when the compartment attains a predetermined temperature, and means for automatically maintaining optimum temperatures of said engine and the passenger compartment for easy starting of the engine and comfort of passengers in said compartment, said means including a temperature controlled switch for effecting the starting and stopping of the engine by the control of said starting motor and ignition system, whereby the engine temperature may be maintained within a definite temperature range and the electrically operated fan is operated during periods of the automatic operation of the engine only in response to a requirement for heat as detected by the operation of the thermostatically operated switch in the passenger compartment, said automatically operated control means for starting and stopping the engine including a manually controlled switch in the passenger compartment for manually controlling the introduction of electric current from the battery power source thereto, a relay having the energization of its operating solenoid controlled by said temperature controlled switch and the energization of the engine ignition system and starting motor controlled by the control contacts of the relay, and a vacuum operated switch having normally closed contacts operated to open position by the engine after it has started for disconnecting the source of electric power from the starting motor after the engine has started.

DANIEL P. MERRITT.

REFERENCES CITED

The following references are of record in the file of this patent:

UNITED STATES PATENTS

| Number | Name | Date |
| --- | --- | --- |
| Re. 21,576 | Berryman | Sept. 24, 1940 |
| 1,287,266 | Eberly | Dec. 10, 1918 |
| 1,293,569 | Stein | Feb. 4, 1919 |
| 1,386,844 | Cowen | Aug. 9, 1921 |
| 1,992,568 | Connor | Feb. 26, 1935 |